United States Patent [19]

Maekawa

[11] 4,056,530
[45] Nov. 1, 1977

[54] PROCESS OF SEMICONTINUOUSLY PRODUCING ANILINE CONDENSED DYES

[75] Inventor: Yoshihiro Maekawa, Nara, Japan

[73] Assignee: Orient Chemical Industries, Ltd., Osaka, Japan

[21] Appl. No.: 693,619

[22] Filed: June 7, 1976

[51] Int. Cl.² .................... C09B 57/00; C09B 59/00
[52] U.S. Cl. ................................. 260/267; 23/252 R
[58] Field of Search ....................................... 260/267

[56] References Cited
U.S. PATENT DOCUMENTS

1,988,499  1/1935  Kimmel ............................... 260/267

Primary Examiner—Floyd D. Higel
Attorney, Agent, or Firm—Sughrue, Rothwell, Mion, Zinn and Macpeak

[57] ABSTRACT

An aniline condensed dye is semicontinuously prepared from aniline and nitrobenzene (and/or alkylanilines, alkylnitrobenzenes, diazoaminobenzene and the like) in the presence of a catalyst such as hydrochloric acid and iron chloride by dividing a reaction system into two or more sections and maintaining each section at a different reaction temperature.

16 Claims, 10 Drawing Figures

PROCESS OF SEMICONTINUOUSLY PRODUCING ANILINE CONDENSED DYES

BACKGROUND OF THE INVENTION

1. Field of the Invention

The present invention relates to a process of semicontinuously producing aniline condensed dyes using a multistage reaction system.

2. Description of the Prior Art

It is well known in the art that in many chemical processes batch operation is more convenient than continuous operation. However, since in a batch process various conditions such as temperature, concentration and the like vary during operation, a substantial amount of operator attention is needed to control the operation, and batch operation, in this respect, is more difficult than continuous operation. Moreover, batch operation has the defect that the quality of the products obtained tends to vary from batch to batch.

Still further, in batch operation the efficiency drops as the member of reaction steps in which the temperature differs increases or as the reaction temperature in each reaction step is increased. That is, when the number of reaction steps increases, operation control becomes difficult, and when the reaction temperature is high, the time for preheating and after-cooling the reaction vessel(s) is prolonged. Thus, an increase in the operation time per batch occurs.

Condensed dyes obtained by the condensation of aniline and nitrobenzene (and/or alkylanilines, alkylnitrobenzenes, diazoaminobenzene, etc.) in the presence of catalysts such as hydrochloric acid and iron chloride are generally called "Spirit Black," "Nigrosine," "Induline," etc., and are widely used as coloring materials for synthetic resins, printing inks, etc. In particular, the annual production of Spirit Black amounts to more than 10,000 tons per year.

Since the reaction of these aniline condensed dyes requires the use of a catalyst having high corrosiveness, such as hydrochloric acid and iron chloride, and is carried out at high temperatures, specific reaction vessels such as a glass-lined reaction vessels are required. In many cases, reaction vessels constructed of materials susceptible to heat shock are used so that a rapid increase or reduction in temperature or a great temperature difference between the reaction vessel wall and the reaction solution charged or heating media introduced into a jacket of reaction vessel, each of which can destroy the reaction vessel, must be avoided.

Thus, in the production of aniline condensed dyes by a batch procedure, high operator skill is required for temperature control, and production efficiency is markedly reduced.

In order to avoid these disadvantages, various continuous reactions have been proposed. However, in continuous reactions, a complicated reaction system is required, a long period of time at high temperatures is needed, the construction materials for the reaction vessel are limited, and the like. Further, even if a large amount of money is expended to provide a complete, continuous reaction apparatus, the amount of product to be sold which permits one to recover the money expended is extremely high. Under such circumstances, currently production of such materials is only by batch procedures.

SUMMARY OF THE INVENTION

As a result of various investigations to improve the aforesaid disadvantages in the conventional processes, the inventor has discovered that aniline condensed dyes can be semicontinuously produced by dividing the reaction system into two or more reaction sections to carry out the reaction at different temperatures and then carrying out the reaction successively in the divided reaction sections while maintaining each reaction section at a different temperature by passing a heat medium at different temperatures through each section. By this discovery, the inventor has succeeded in semicontinuously producing a large amount of the desired material in a very short period of time at a low cost as compared to conventional batch or continuous systems.

That is, according to the present invention, there is provided a process of semicontinuously producing aniline condensed dyes which comprises dividing a reaction system into two or more reaction sections to carry out the reaction at different temperatures, and carrying out the reaction successively in the divided reaction sections while maintaining each reaction section at a different temperature by passing a heat medium of the desired temperature through each reaction section.

DESCRIPTION OF THE PREFERRED EMBODIMENTS

The process of this invention is based on the technique that the reaction system is divided into two or more reaction sections, each of which comprises one or more reaction vessels heated with a substantially equal temperature heating medium. Each reaction section may thus comprise one or a plurality of reaction vessels. It is to be noted, in this regard, that the useful number of reaction sections is not especially limited (so long as a plurality is provided) and the number of reaction vessels in each reaction section is also not especially limited. However, on a commercial scale, it is necessary to consider the economics of constructing rather small scale reaction sections or reaction vessels within each section, and, accordingly, on a commercial scale generally two or three reaction sections will be utilized, and within each reaction section 1, 2 or 3 reaction vessels will be used. In this regard, it is not necessary that the number of reaction vessels in each reaction section be equal, and, in fact, the number of reaction vessels in each reaction section can differ, if desired. Often identical equipment can be purchased from an equipment manufacturer at lowered cost and often all reaction vessels over the process line will be substantially identical in size. However, it is most preferred in accordance with the present invention to utilize two reaction sections wherein the first reaction section comprises one reaction vessel and the second reaction section comprises two or three reaction vessels (cf. Example 2). That is, in the process of this invention, the reaction system for carrying out the condensation reaction is divided into two or more reaction sections, and heat media, each maintained at a substantially constant temperature within a reaction section, are used for heating the reaction sections. The process of this invention has, therefore, the merits that the heat media can be easily controlled to improve the productivity, and, hence, efficiency of operational control is greatly improved.

Figure 2:
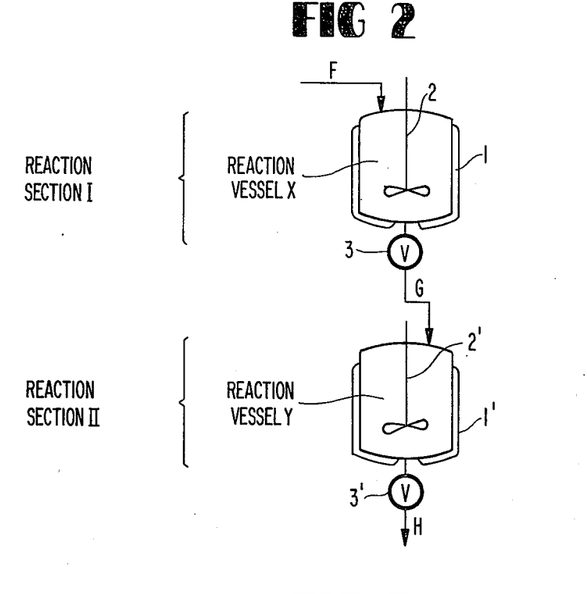
FIG. 2 shows the reaction system used in Example 1.

When, for example, raw materials at 70° C are reacted for 8 hours at about 180° C according to the process of this invention, the raw materials at 70° C are first charged in a first reaction section (which comprises one reaction vessel, Reaction Vessel X) which has been heated to 165° C to raise the temperature of the raw materials up to about 160° C and to dehydrate the raw materials. By charging the raw materials to the thus preheated Reaction Vessel X as described above, the period of time required to raise the temperature and dehydrate the raw materials can be shortened. The reaction mixture at 160° C in the first reaction section is then introduced into a second reaction section (which comprises one reaction vessel, Reaction Vessel Y) heated by a heat medium at 230° C to raise the temperature of the reaction mixture from about 160° to about 180° C and to perform the reaction at that temperature. In this case also, by charging the reaction mixture to the thus preheated second reaction section, the period of time required to raise the temperature can be shortened. This reaction system is shown in FIG. 2.

In the semicontinuous process of the present invention, as earlier indicated, it is highly preferred that where more than one reaction vessel is utilized in a reaction section that all reaction vessels in that reaction section be maintained at substantially the same temperature. Further, as earlier indicated, the reaction sections are maintained at temperatures which differ from each other. The rule in this regard is that where two reaction sections are utilized, the second reaction section is maintained at a temperature higher than the first reaction section. Where three reaction sections are utilized, the second reaction section is maintained at a temperature greater than the first reaction section. The third reaction section is also generally maintained at a temperature greater than the second reaction section.

When two reaction sections are utilized, the second reaction section is, as indicated above, maintained at a temperature higher than the first reaction section. In this case, when the second reaction section is maintained at a relatively high temperature, the temperature difference between the first and second reaction sections must be relatively small from the viewpoint of the susceptibility of the vessel wall to heat shock (cf. FIG. 10). On the other hand, when the second reaction section is maintained at a relatively low temperature, a fairly large temperature difference between the first and second reaction sections is permissible. Since these parameters can obviously be widely varied within the preferred operational ranges, as later discussed, the temperature difference between the first and second reaction sections cannot be unequivocally defined. A similar situation is encountered in the case wherein three reaction sections are utilized. For example, typically in a two reaction section semicontinuous process, the main function of the first reaction section is to bring the raw materials to a temperature relatively close to the actual reaction temperature and to dehydrate the same, so that upon introduction into the second reaction section, reaction can be very quickly initiated, and, of course, completed in a short time.

A three reaction section semicontinuous process will generally be most profitably utilized when following some point in reaction at a first temperature some benefit is achieved by conducting further reaction at yet a higher temperature, for example, in the case where due to some change in the character of the system with increasing conversion to the final product a benefit in conversion efficiency or reaction rate is achieved by operation at a higher temperature.

On a commercial scale, for the vast majority of condensed aniline dyes produced by the semicontinuous process of the present invention, in a two stage reaction the first reaction section is maintained at a temperature of from about 40° to about 170° C, more preferably from 130° to 170° C, and the second reaction section is maintained at a higher temperature within the range of from about 120° to about 220° C, more preferably from 180° to 220° C, whereas for a three stage reaction the first reaction section is most conveniently maintained at a temperature of from about 40° to about 120° C, the second reaction section is maintained at a higher temperature of from about 100° to about 170° C, and the third reaction section is maintained at a still higher temperature of from about 150° to about 220° C.

Figure 10:
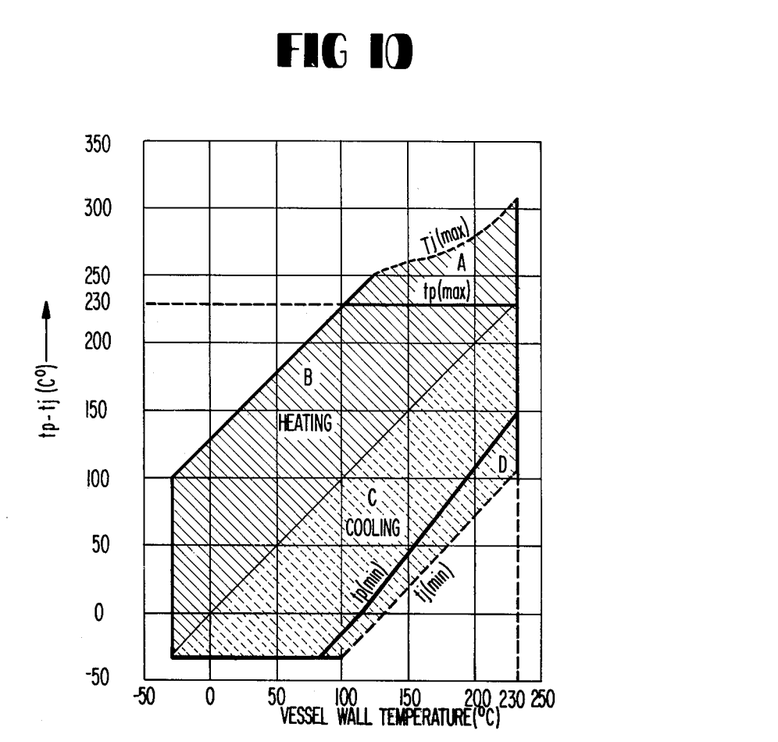
FIG. 10 shows the allowed temperature difference for a glass-lined reactor (published by Pfaudler Co.).

In this regard, it should be noted that the maximum temperature difference between the temperature of the feed solution fed to any vessel and the temperature of the vessel wall, and the maximum temperature difference between the vessel wall and the medium utilized to heat the same, are limited by the susceptibility of the vessel wall to heat shock. This parameter can be easily determined by one skilled in the chemical engineering art, and one example of susceptibility to heat shock is illustrated in FIG. 10, which gives the susceptibility to heat shock of a glass-lined vessel, wherein hatched zone A (inside of $t_j$(Max)) applies to the case of introducing steam into the jacket; hatched zone B (inside of $t_p$(Max)) applies to the case of feeding hot liquid into the vessel; hatched zone C (inside of $t_p$(Min)) applies to the case of feeding cold liquid into the vessel; and hatched zone D (inside of $t_j$(Min)) applies to the case of introducing cold liquid into the jacket. In the above, $t_j$ means the medium temperature in a jacket and $t_p$ means the temperature of the solution introduced into the reaction vessel.

It will thus be easily seen by one skilled in the art that according to semicontinuous process of this invention, by processing in the first reaction section (Reaction Vessel X at 160° C) one can feed the product of the first reaction section directly to the second reaction section (Reaction Vessel Y), and, of course, immediately introduce a fresh batch of raw materials into the first reaction section (Reaction Vessel X) without any waste or "down" time for either reaction vessel. Assuming that the size/residence time of the reaction sections are appropriately correlated, it is thus possible to semicontinuously withdraw materials from the second reaction section, introduced materials thereinto from the first reaction section, and introduce fresh raw materials into the first reaction section, whereby a highly efficient process is obtained without any reaction vessel waste or down time.

Therefore, the reaction can be performed semicontinuously in each reaction section without having any vacant reaction section at any time according to the process of this invention, which greatly increases productivity, and, further, the temperature of the heat medium used for heating each reaction section is substantially constant in this invention, which also improves operational efficiency.

The reaction sections or vessels used in the process of this invention may be disposed vertically or horizontally, or, further, can be slanted. If in any of the reaction sections the residence time therein differs from that in the other reaction section(s), for example, assume two reaction sections and the period of time required for finishing the reaction in the first reaction section differs from that in the second reaction section, the process can be performed more efficiently by employing reaction vessels of corresponding numbers to each desired reaction time period. For example, when it takes 4 hours to finish the reaction in the first reaction section and 8 hours to finish the reaction in the second reaction section, production rates can be further increased without having vacant time in any reaction section by employing one reaction vessel for the first reaction section and two reaction vessels for the second reaction section, in the case where the reaction vessels have the same capacity. (This embodiment gives particularly remarkable effects or merits when the reaction requires one to use reaction vessels of inferior heat shock resistance, such as glass-lined reaction vessels.)

From the above discussion, it should be apparent to one skilled in the art that the residence time in each vessel can vary substantially, depending upon various factors such as the temperature, the amount of catalyst, the proportion of reactants and the like. Typically, on a commercial scale, the residence time is on the order of about 2 to about 20 hours.

The aforesaid explanation of the present invention refers to the semicontinuous production of aniline condensed dyes, but this invention is not limited only to this case and can be applied to any reactions which are carried out at high temperatures for extended periods of time.

For example, as earlier illustrated, the present invention can be utilized for the semicontinuous production of aniline condensed dyes from reactants such as aniline (boiling point: 180° C), nitrobenzene (boiling point: 210° C), alkylanilines (wherein the alkyl moiety has 1 to 30 carbon atoms), alkylnitrobenzenes (in which the alkyl moiety has 1 to 30 carbon atoms), diazoaminobenzene and the like, utilizing catalysts such as one or more of HCl, Fe powder, $FeCl_2$, $FeCl_3$, $ZnCl_2$, $SnCl_2$, $AlCl_3$, and the like, with HCl plus one or more of Fe powder, $FeCl_2$ and $FeCl_3$ being preferred. The proportion of catalytic substances can be widely varied by one skilled in the art, and accordingly, cannot be unequivocally defined.

Useful products produced in accordance with the present invention will be apparent to one skilled in the art from the above recitation of reactants, but some of the commercially most important products include Spirit Black, Nigrosine and Induline.

The ratio of various reactants utilized can vary substantially in the process of the present invention, but on a commercial scale very good results are obtained when the following materials are utilized in the recited amounts:

Aniline: 10 parts by weight;
Nitrobenzene: about 0.4 to about 10 parts by weight;
Alkylanilines, Alkylnitrobenzenes and Diazoaminobenzene (mixtures can also be utilized, in which case the total amount thereof is within the recited range):
0 to about 10 parts by weight;
Catalyst (mixtures can, of course, be utilized, in which the total amount of catalyst is then within the recited range): about 0.01 to about 10 parts by weight Typically, the reaction solution after completion of the reaction has a viscosity of from about 1,000 cp to about 100,000 cp or more at 25° C (depending upon the ratio of the reactants), and thus is easily handled following the completion of the reaction.

The process of the present invention is conveniently performed at atmospheric pressure, but this is not, of course, mandatory. Sub-atmospheric pressures may be used, if desired, but such are generally uneconomical as compared to operation at other pressures. Super-atmospheric pressures may also be utilized, is desired, and if such are practiced, generally a positive pressure of up to about 3 $kg/cm^2$ (gauge) is utilized.

The present invention will now be illustrated in greater detail with reference to the following Reference Example and Examples. In all Reference Example and Examples, all processings were carried out substantially at atmospheric pressure.

REFERENCE EXAMPLE

Figure 1:
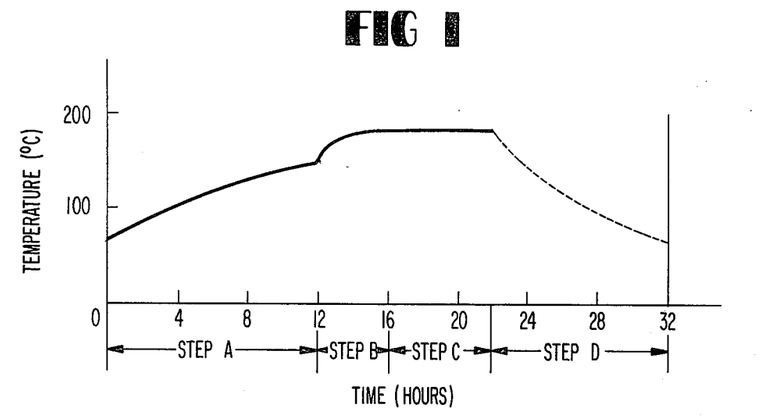
FIG. 1 shows the relationship between the temperature and time of the process used in the Reference Example.

Into a 1,500 l glass-lined reaction vessel were charged 750 kg of aniline, 35 kg of nitrobenzene, 26 kg of 30% hydrochloric acid and 35 kg of ferrous chloride, and the reaction system was heated to 150° C over a period of about 12 hours (this step being referred to as "Step A"). During Step A, dehydration was also performed. The reaction system was then further heated to 180° C over a period of about 4 hours (this step being referred to as "Step B"), and the oxidative condensation was carried out at this temperature for 6 hours (this step being referred to as "Step C"). The resulting reaction solution was treated in a conventional manner to remove unreacted aniline, nitrobenzene, catalyst and oxidative derivatives (e.g., iron oxide) to form the product, i.e., Nigrosine. It required 22 hours to complete one batch operation of the process from Step A to Step C. The relationship between the temperature and time of the above process is shown in FIG. 1.

If reaction of the next batch were to be subsequently carried out in the same reaction vessel, cool raw materials would be immediately fed tinto the reaction vessel which has been heated to a high temperature. This procedure cannot be used, however, due to heat shock problems with the reaction vessel, and, therefore, the reaction vessel must be cooled, for example, by allowing it to stand at a temperature at which heat shock problems do not occur. This step is referred to as "Step D" in FIG. 1. That is, it substantially requires 32 hours to complete one batch operation of the above process, i.e., from Step A to Step D.

The reaction vessel is generally provided with a conventional condenser, decanter and return pipe to ensure refluxing aniline and nitrobenzene to the vessel and to eliminate water formed. These are not shown in the drawing. Further, in the drawings, since conventional means are utilized to introduce and withdraw heating medium into jackets as are described, such conventional means are not shown.

EXAMPLE 1

The reaction of the Reference Example as set forth previously was carried out in a semicontinuous batch manner in accordance with the present invention, details of which are described below with reference to FIG. 2.

Reaction section I of the reaction system comprised one reaction vessel (Reaction Vessel X) and reaction section II comprised one reaction vessel (Reaction Vessel Y), respectively, and these two reaction vessels were set as shown in FIG. 2.

The raw materials preheated to 70° C were charged into a 1,500 l glass-lined reaction vessel through conduit F, which reaction vessel was provided with stirrer 2 and covered with jacket 1. The jacket was kept at a temperature of 165° C by saturated vapor at 165° C. Thus, the raw materials fed in the reaction vessel were rapidly heated and dehydrated to thereby complete Step A in a short period of time, i.e., 8 hours. The temperature inside the reaction vessel was found to be about 150° C. The resulting reaction solution was then sent to Reaction Vessel Y through conduit G by opening valve 3 provided in conduit G, which reaction vessel was also provided with a stirrer 2' and covered with a jacket 1'. Jacket 1' was kept at a temperature of 210° C by saturated vapor at 210° C. Thus, the reaction solution sent into Reaction Vessel Y was rapidly heated to thereby complete Step B. It required 2 hours to complete Step B. The temperature inside the reaction vessel was found to be 180° to 190° C. After Step B was completed, Step C was completed while maintaining this temperature (180° to 190° C) for 6 hours. After completion of the reaction, the reaction solution was taken out through conduit H by opening valve 3'.

Figure 3:
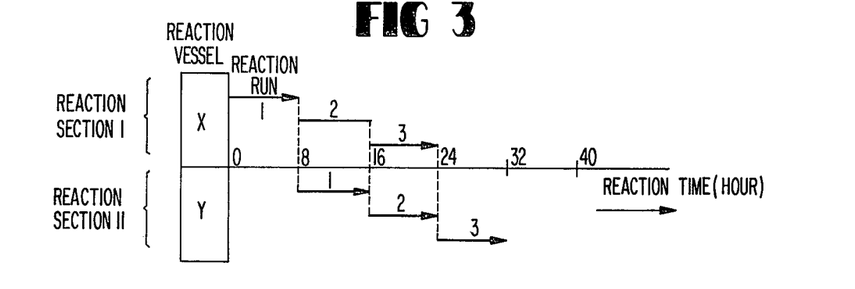
FIG. 3 shows an operational diagram for Example 1. In the operational diagrams, each line shows the reaction period in each reaction vessel and the number above the line indicates the reaction run number.
Figure 4:
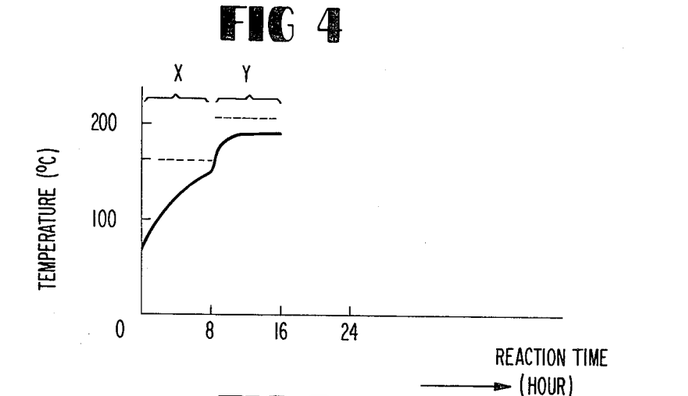
FIG. 4 shows the temperature change of each reaction vessel used in Example 1.

By practicing Steps B and C in Reaction Vessel Y while practicing Step A of next reaction batch in Reaction Vessel X, both Reaction Vessels X and Y can be used at high efficiency without waste or "down" time. FIGS. 3 and 4 are provided for the purpose of illustrating the above behavior more clearly; FIG. 3 is an operational diagram and FIG. 4 shows the temperature change in each reaction vessel with the passage of time. In FIG. 4, the dotted line shows the temperature inside the reaction vessel.

As is clear from the above drawings, one batch operation in this Example was completed in 16 hours, which is a superior production rate almost twice that of the Reference Example.

After completion of the reaction, the reaction solution was treated in the same manner as in the Reference Example to obtain the desired product, i.e., Nigrosine.

Each reaction vessel was provided with a conventional condenser, decanter and return pipe to ensure refluxing aniline and nitrobenzene to the vessel and elimination of water. These are not shown in the drawing.

EXAMPLE 2

Figure 5:
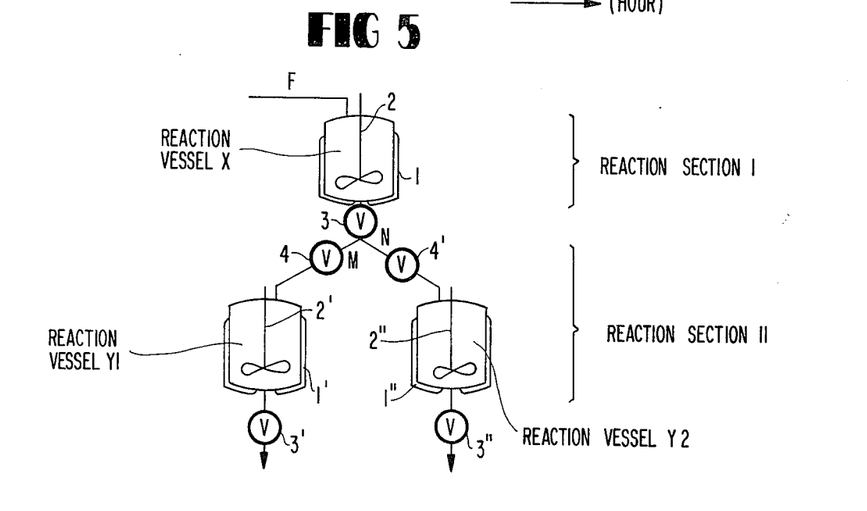
FIG. 5 shows the reaction system used in Example 2.

The same reaction as in the Reference Example was carried out using a reaction system as shown in FIG. 5, in which the time for Step A was 12 hours, the time for Step B was 5 hours and the time for Step C was 13 hours.

Reaction section I of the reaction system comprised one reaction vessel (Reaction Vessel X) and reaction section II comprised two reaction vessels (Reaction Vessels $Y_1$ and $Y_2$). These three reaction vessels were set as shown in FIG. 5.

The raw materials, which were preheated to 70° C, were charged into Reaction Vessel X through conduit F, which reaction vessel was provided with stirrer 2 and covered with jacket 1. The jacket was kept at a temperature of 165° C by saturated vapor at 165° C. Thus, the raw materials fed into Reaction Vessel X were rapidly heated and dehydrated to thereby complete Step A in a short period, i.e., 8 hours. The temperature inside Reaction Vessel X was found to be about 150° C. The resulting reaction solution was then sent to Reaction Vessel $Y_1$ through conduit M via valves 3 and 4, which reaction vessel was also provided with a stirrer 2' and covered with a jacket 1'. Jacket 1' was kept at a temperature of 210° C by saturated vapor at 210° C. Since Reaction Vessel $Y_1$ was preheated to 210° C, the temperature of the reaction solution fed thereto was rapidly raised to the reaction temperature (180° to 190° C) to thereby complete Step B. It required 3 hours to complete Step B. The resultant mass was maintained at this temperature until Step C was completed. Step C took 13 hours.

On the other hand, after supplying the reaction solution of Step A to Reaction Vessel $Y_1$, new raw materials were immediately charged to Reaction Vessel X to carry out Step A of the next batch. After completing Step A at the conditions above described, the resulting reaction solution was sent to Reaction Vessel $Y_2$ through conduit N via valves 3 and 4' to carry out Step B and Step C at the conditions used in Reaction Vessel $Y_1$. Reaction Vessel $Y_1$ was also provided with a stirrer 2" and was covered with a jacket 1". The jacket was kept at a temperature of 210° C by saturated vapor at 210° C.

The reaction solutions in Reaction Vessels $Y_1$ and $Y_2$ were taken out via valves 3' and 3", respectively.

Figure 6:
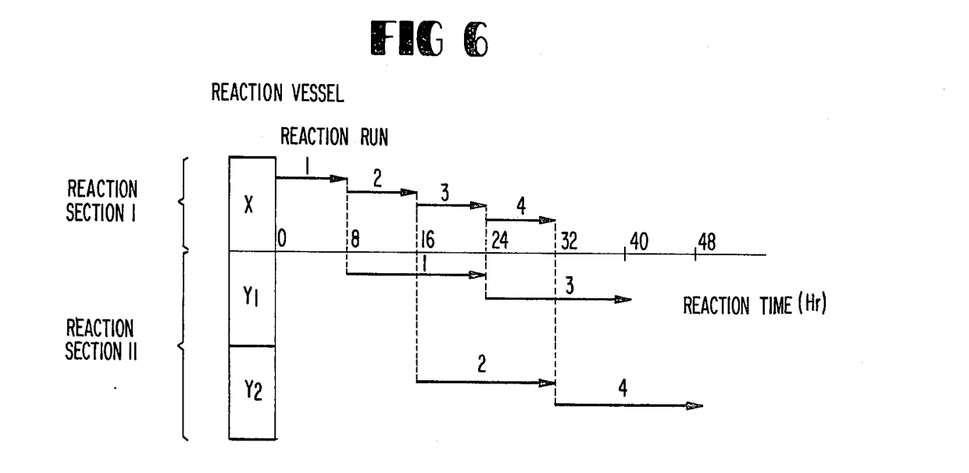
FIG. 6 shows an operational diagram for Example 2.
Figure 7:
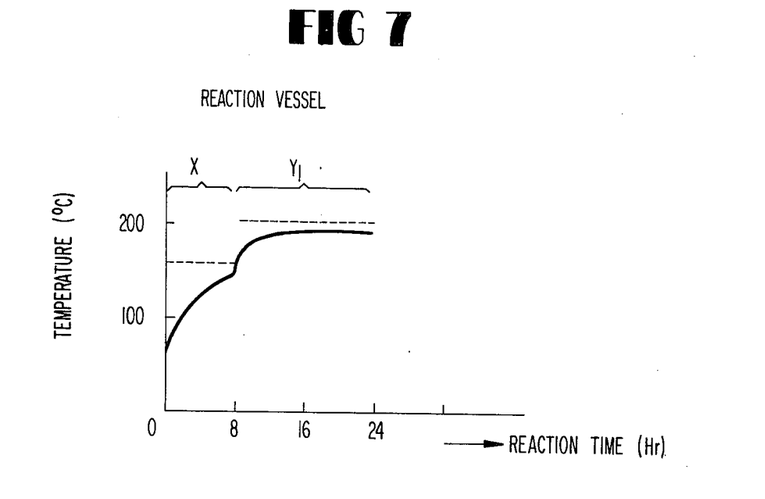
FIG. 7 shows the temperature change of each reaction vessel used in Example 2.

The reaction was thus repeatedly performed in the same manner as set forth previously. Each reaction vessel can be used without any substantial wasted or "down" time. FIGS. 6 and 7 are provided for the purpose of illustrating the above behavior more clearly. FIG. 6 is an operational diagram and FIG. 7 shows the temperature change of the reaction vessel.

As is clear from these drawings, one batch operation in this Example was completed in 24 hours. On the contrary, the total time spent in the operation in a corresponding Reference Example was 40 hours, i.e., 12 hours for Step A, 5 hours for Step B, 13 hours for Step C and 10 hours for Step D. The production rate in this Example was superior to a degree of about 67% as compared to that in a corresponding Reference Example.

Each reaction vessel was provided with a conventional condenser, decanter and return pipe to ensure refluxing aniline and nitrobenzene to the vessel and eliminating the water. These are not shown in the drawing.

EXAMPLE 3

Figure 8:
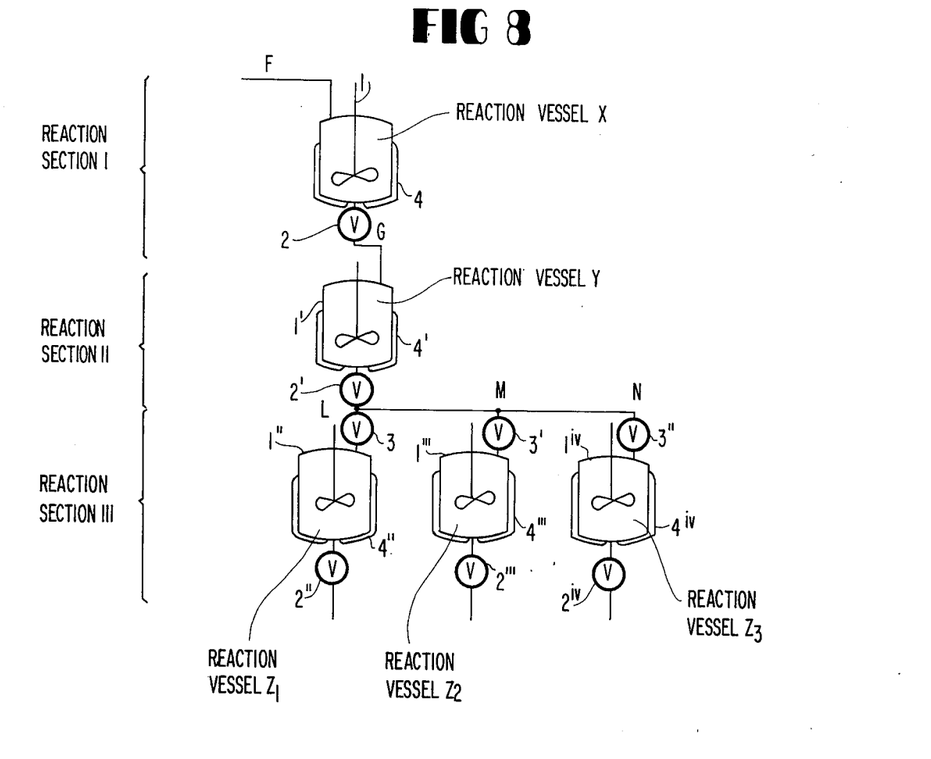
FIG. 8 shows the reaction system used in Example 3.

The synthesis of Induline was carried out using a reaction system as shown in FIG. 8. The reaction system was divided into three reaction sections, i.e., reaction sections I, II and III. Each of reaction sections I and Ii comprised one reaction vessel. On the other hand, reaction section III comprised three reaction vessels.

300 kg of aniline, 130 kg of the hydrochloric acid salt of aniline and 100 kg of diazoaminobenzene were charged into Reaction Vessel X through conduit F, which reaction vessel was provided with stirrer 1 and covered with jacket 4. The jacket was kept at a temperature of 30° C by water. The mixture charged was subjected to reaction at 40° to 50° C for 4 hours. After completion of the reaction, the resulting reaction solution was sent to Reaction Vessel Y through conduit G via valve 2, which reaction vessel was provided with a stirrer 1' and covered with a jacket 4'. The jacket was preheated to 110° C by means of a steam (hereafter preheating was always conducted by steam jacket, unless otherwise indicated). In Reaction Vessel Y, a transition reaction was initiated at 110° C and continued at 110° C for 4 hours. After completion of the transition reaction, the reaction solution was sent to Reaction Vessel $Z_1$ through conduit L via valves 2'and 3. Reaction Vessel $Z_1$ also had a stirrer 1" and was covered with a jacket 4", and was preheated to 170° C. In this reaction vessel, the condensation was performed at 160° to 170° C for 12 hours. The resultant product was then taken out through valve 2" and the next step was then performed.

In Reaction Vessels X and Y, after sending the reaction solution to the next reaction section, fresh raw materials or reaction solution was immediately charged, whereby the reaction was newly performed. Since the reaction in reaction section III is carried out for a long period of time, Reaction Vessels $Z_1$, $Z_2$ and $Z_3$ are successively used. The reaction solution in Reaction Vessel Y was sent to Reaction Vessel $Z_2$ or $Z_3$ through conduit M or N via valves 2' and 3' or 2' and 3", respectively. Each of Reaction Vessels $Z_2$ and $Z_3$ was provided with a stirrer 1''' or $1^{iv}$, and provided with a jacket 4''' or $4^{iv}$, and the reaction solution was taken out through valves 2''' or $2^{iv}$, respectively.

Figure 9:
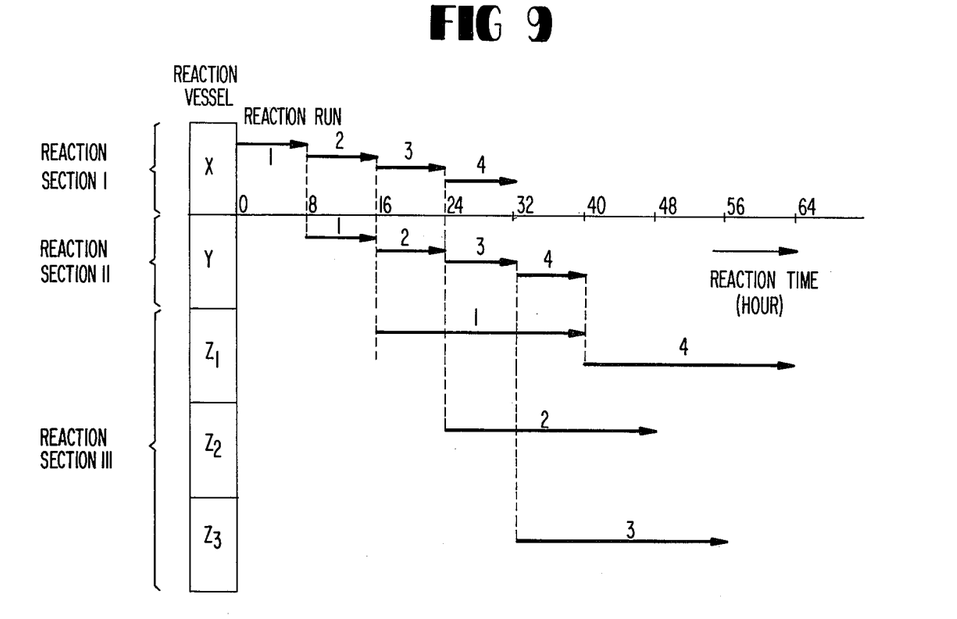
FIG. 9 shows an operational diagram for Example 3.

An operational diagram as shown in FIG. 9 will make the use of these reaction vessels clear.

Each reaction vessel (except Reaction Vessel X) was provided with a conventional condenser, decanter and return pipe to ensure refluxing aniline to the vessel and elimination of water. These are not shown in the drawing.

According to the above described procedure, each reaction vessel can be used without wasted or "down" time. Further, since the temperature differences between the reaction vessels of each reaction section are small, no problem with respect to the heat shock occurs. Still further, since the temperature inside each reaction vessel's jacket may be maintained at a constant temperature, reaction control is very easy, and, therefore, substantial industrial benefits are achieved.

While the invention has been described in detail and with reference to specific embodiments thereof, it will be apparent to one skilled in the art that various changes and modifications can be made therein without departing from the spirit and scope thereof.

What is claimed is:

1. In a process for the production of aniline condensed dyes comprising the reacting, by heating, of the raw materials aniline and at least one of nitrobenzene, an alkylaniline, an alkylnitrobenzene or diazoaminobenzene in the presence of a catalyst wherein the heating is in a reaction system comprising reaction vessels susceptible to heat shock, the improvement which comprises:
   i. dividing said reaction system into at least two reaction sections, each section comprising one or more reaction vessels, the second section being maintained at a higher temperature than the first section; and
   ii. reacting said raw materials by secessively and semicontinuously introducing batches of raw materials into said first reaction section and introducing the product therefrom into the second reaction section without down times in the reaction vessels prior to said introductions.

2. The process of claim 1, wherein said first reaction section is maintained constantly at a temperature between about 40° to about 170° C while said second reaction section is maintained constantly at a temperature in the range between about 120° to about 220° C.

3. The process of claim 2, wherein the number of reaction vessels in said second rection section is equal to or more than the number of reaction vessels in said first reaction section.

4. The process of claim 3, wherein the raw materials are aniline and nitrobenzene.

5. The process of claim 3, wherein the raw materials are aniline and diazoaminobenzene.

6. The process of claim 3, wherein said reaction vessels are glass-lined vessels.

7. The process of claim 1, wherein the number of reaction vessels in each reaction section is approximately in direct proportion to the reaction time required by the reaction in each reaction section, each vessel having approximately the same capacity.

8. In a process for the production of aniline condensed dyes comprising the reacting, by heating, of the raw materials aniline and at least one of nitrobenzene, an alkylaniline, an alkylnitrobenzene or diazoaminobenzene in the presence of a catalyst wherein the heating is in a reaction system comprising reaction vessels susceptible to heat shock, the improvement which comprises:
   i. dividing said reaction system into at least three reaction sections, each section comprising one or more reaction vessels, the second section being maintained at a higher temperature than the first section and the third reaction section being maintained at a higher temperature than the second section; and
   ii. reacting said raw materials by successively and semicontinuously introducing batches of raw materials into said first reaction section, introducing the product therefrom into the second reaction section and introducing the product therefrom into the third reaction section without down times in the reaction vessels prior to said introduction.

9. The process of claim 8, wherein said first, second and third reaction sections are maintained constantly each at a temperature in the ranges between about 40° to about 120° C, about 100° to about 170° C and about 150° to about 220° C, respectively.

10. The process of claim 9, wherein the number of reaction vessels in said second and third reaction sections are each equal to or more than the number of reaction vessels in said first reaction section.

11. The process of claim 10, wherein the raw materials are aniline and nitrobenzene.

12. The process of claim 10, wherein the raw materials are aniline and diazoaminobenzene.

13. The process of claim 10, wherein said reaction vessels are glass-lined vessels.

14. The aniline condensed dye production of claim 8, wherein the number of reaction vessles in each reaction section is approximately in direct proportion to the reaction time required by the reaction in each reaction section, each vessel having approximately the same capacity.

15. In a process for the production of aniline condensed dyes comprising the reacting, by heating, of the raw materials aniline and at least one of nitrobenzene, an alkylaniline, an alkylnitrobenzene or diazoaminobenzene in the presence of a catalyst wherein the heating is in a reaction system susceptible to heat shock, the improvement which comprises:

i. dividing said reaction system into two reaction sections, the number of reaction vessels in each section being in approximately direct proportion to the required reaction time in each section, each vessel having approximately the same capacity, wherein the second reaction section is maintained at a higher temperature than the first section and wherein each vessel in a section is maintained at substantially the same temperature; and    ii. reacting said raw materials by successively and semicontinuously introducing batches of raw materials into said first reaction section and therefrom into an available vessel in said second reaction section without down times in the reaction vessels prior to said introductions.

16. In a process for the production of aniline condensed dyes comprising the reaction, by heating, of the raw materials aniline and at least one of nitrobenzene, and alkylaniline, an alkylnitrobenzene or diazoaminobenzene in the presence of a catalyst wherein the heating is in a reaction system susceptible to heat shock, the improvement which comprises:

i. dividing said reaction system into three sections, the number of reaction vessels in each section being in approximately direct proportion to the required reaction time in each section, each vessel having approximately the same capacity, wherein the second reaction section is maintained at a higher temperature than the first section and the third reaction section is maintained at a higher temperature than the second section and wherein each vessel in a section is maintained at substantially the same temperature; and    ii. reacting said raw materials by successively and semicontinuously introducing batches of raw materials into said first reaction section, therefrom into an available vessel in said second reaction section and therefrom into an available vessel in said third reaction section without down times in the reaction vessels prior to said introductions.

* * * * *